Figure 28:
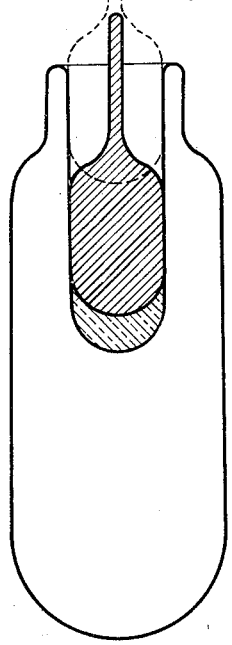

May 22, 1934.   M. BATSCHÜK ET AL   1,960,045
PROCESS FOR THE MANUFACTURE OF DOUBLEWALLED FLASKS
Filed Dec. 16, 1931   4 Sheets-Sheet 1
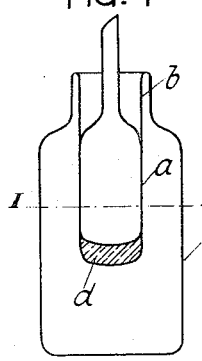
FIG. 1
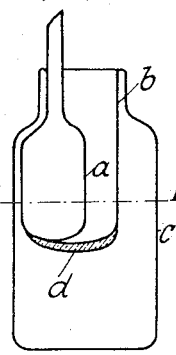
FIG. 3
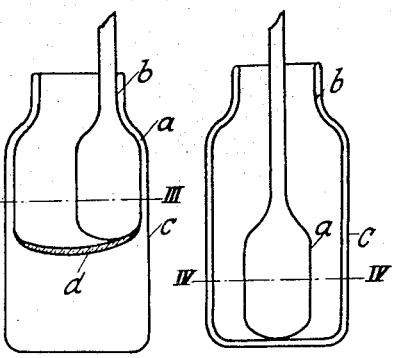
FIG. 5
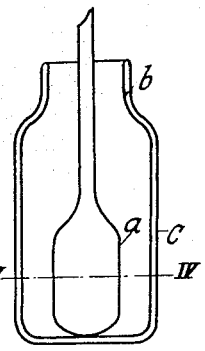
FIG. 7
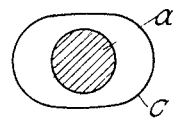
FIG. 2
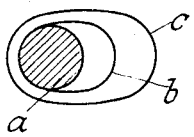
FIG. 4
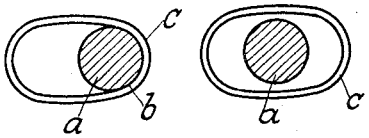
FIG. 6
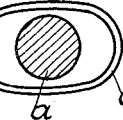
FIG. 8
FIG. 9
FIG. 10
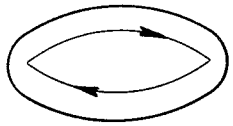
FIG. 11
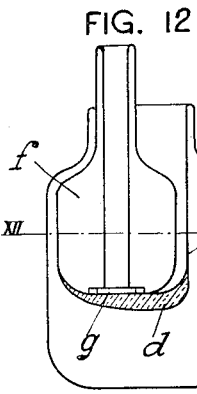
FIG. 12
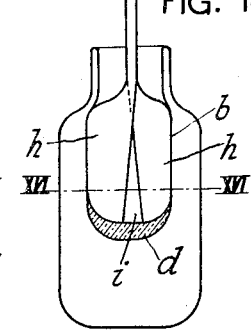
FIG. 16
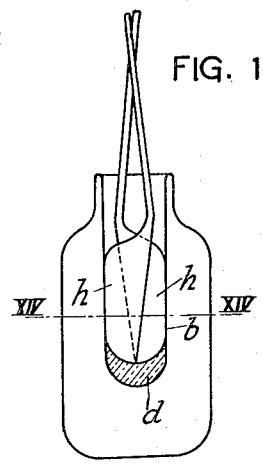
FIG. 14
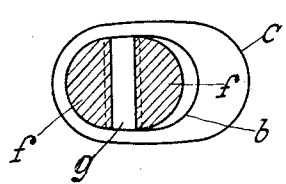
FIG. 13
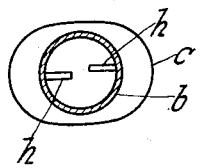
FIG. 17
FIG. 15
Inventors:
MAX BATSCHÜK
WILHELM HODECKER
By
Rika + Kehlenbeck
Attorneys.

May 22, 1934.  M. BATSCHÜK ET AL  1,960,045
PROCESS FOR THE MANUFACTURE OF DOUBLEWALLED FLASKS
Filed Dec. 16, 1931  4 Sheets-Sheet 2
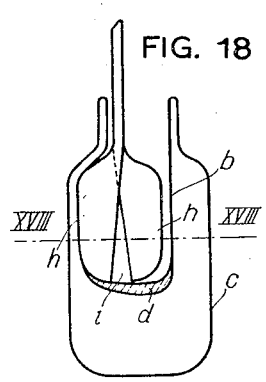
FIG. 18
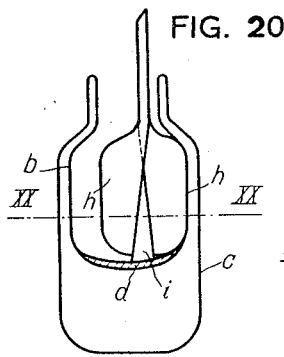
FIG. 20
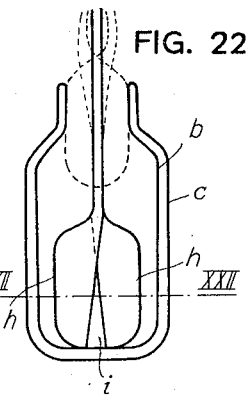
FIG. 22
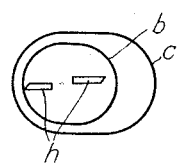
FIG. 19
FIG. 21
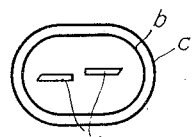
FIG. 23
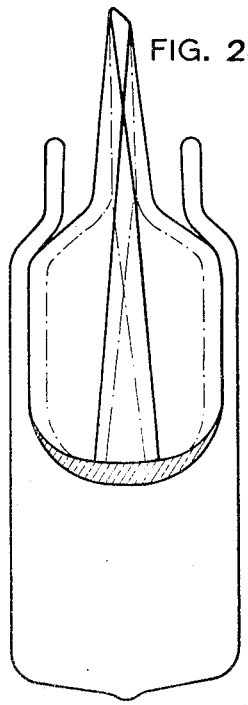
FIG. 24
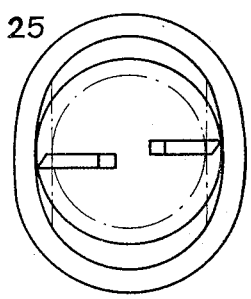
FIG. 25
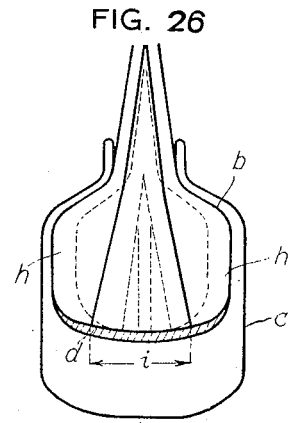
FIG. 26
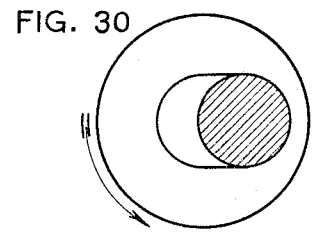
FIG. 30
FIG. 31
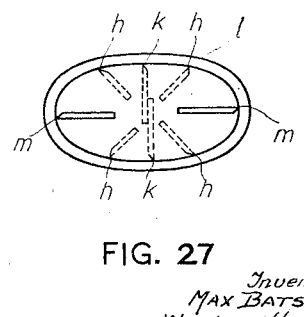
FIG. 27
Inventors
MAX BATSCHÜK
WILHELM HODECKER
By
Attorneys.

May 22, 1934.  M. BATSCHÜK ET AL  1,960,045
PROCESS FOR THE MANUFACTURE OF DOUBLEWALLED FLASKS
Filed Dec. 16, 1931   4 Sheets-Sheet 4

Inventors:
MAX BATSCHÜK
WILHELM HODECKER
By
Attorneys.

Patented May 22, 1934

1,960,045

UNITED STATES PATENT OFFICE 1,960,045

PROCESS FOR THE MANUFACTURE OF DOUBLEWALLED FLASKS

Max Batschük and Wilhelm Hodecker, Ilmenau, Germany, assignors to Glasfabrik Sophienhütte Richard Bock G. m. b. H., Ilmenau, Germany Application December 16, 1931, Serial No. 581,290
In Germany December 19, 1930

9 Claims. (Cl. 49—84)

It is already known to manufacture double-walled hollow glass bodies by first blowing a hollow body on the pipe in a mould, the said hollow body corresponding to the final shape of the outer vessel and to a bottom cap connected together with this outer part at the future edge of the mouth, the said cap being thereupon pushed inside the outer part by means of a core for the formation of the inner vessel.

In this known process, the movement of the hollow glass body (blank) and of the core (tool) takes place merely in the direction of the longitudinal axis of the hollow glass body or in the longitudinal axis of the tool.

This method of moving the blank and the tool relatively to one another is inadequate, when used alone, to produce satisfactory results in cases where for example vessels of non-circular cross-section are to be manufactured, or flasks with a circular cross-section and a relatively wide body in comparison with the neck opening are to be formed.

According to the present invention, the manufacture of the inner member of a double-walled vessel of glass is effected in one operation at the furnace while the outer surface of said member is free, by moving the blank and the tool relatively to one another not only in the direction of the longitudinal axis of the vessel or the longitudinal axis of the tool but also perpendicularly thereto for the purpose of forming the inner vessel from the hot, molten mass of glass.

If double-walled flasks or vessels or non-circular cross-sections are to be manufactured, the movement of the blank and of the tool relatively to one another and perpendicularly to the longitudinal axis of the blank or tool is, according to the invention, rectilinear or proceeds along a curved path symmetrically about a centre. Instead of the movement of the blank and tool relatively to one another and perpendicularly to the longitudinal axis of the blank or tool, a movement may also be provided wherein the tool, which is in the form of an expansible distending device or mandrel moves in itself perpendicularly to the longitudinal axis of the blank.

Finally, a curved eccentric movement of the hollow glass body and tool relatively to one another and perpendicularly to the longitudinal axis of the vessel may also be provided if vessels of non-circular cross-section are to be formed. This process, however, is also suitable for making vessels (flasks) of circular cross-section.

The action of the new process will be explained in several examples in reference to the accompanying drawings, wherein Figures 1 to 27 relate to the manufacture of double-walled flasks of non-circular cross-section and Figures 28 to 43 to the manufacture of flasks of circular cross-section. Figs. 1, 3, 5 and 7 are vertical axial sections illustrating one embodiment of our improved process in four successive stages; Figs. 2, 4, 6 and 8 are horizontal sections on lines I—I, II—II, III—III and IV—IV of Figs. 1, 3, 5 and 7 respectively; Figs. 9, 10 and 11 are diagrams illustrating three different movements which may be given to the tool in accordance with our invention; Figs. 12 and 13 are views corresponding substantially to Figs. 3 and 4 (Fig. 13 being a section on line XII—XII of Fig. 12) but illustrating an expansible tool instead of the solid tool shown in Figs. 1 to 8; Figs. 14, 16, 18, 20 and 22 are vertical axial sections illustrating the successive stages of another embodiment of our improved process; Figs. 15, 17, 19, 21 and 23 are horizontal sections on lines XIV—XIV, XVI—XVI, XVIII—XVIII, XX—XX and XXII—XXII respectively of Figs. 14, 16, 18, 20 and 22; Fig. 24 is an axial vertical section, and Fig. 25 a corresponding horizontal section illustrating how certain straight wall portions produced according to Figs. 14 to 23 may be given a curved form; Fig. 26 is a vertical axial section and Fig. 27 a corresponding horizontal section illustrating still another embodiment of our invention; Figs. 28, 34, 36, 38, 40 and 42 are vertical axial sections illustrating successive stages of a further embodiment of our invention; Figs. 29, 35, 37, 39, 41 and 43 are horizontal sections corresponding to Figs. 28, 34, 36, 38, 40 and 42 respectively, and Figs. 30, 31, 32 and 33 are further horizontal sections illustrating this embodiment of our invention.

First of all, the outer body is blown in known manner into a mould, the mass of glass $d$ required for forming the inner vessel is applied to the drawn-in cap $b$ of the outer vessel $c$, and is pushed through the neck of the vessel with the aid of the mandrel $a$ (Figures 1 to 8). When the mandrel has been pushed to a sufficient depth into the outer body $c$ (Figures 1 and 2), the whole of the outer flask body $c$ (in the constructional example Figures 3 and 4) is moved to the right or the tool $a$ is moved to the left, this rectilinear movement being effected in the direction of the major axis of the non-circular cross-section. The mass of glass $d$, which is still in the hot, molten state, is thereby pressed to the side so as to form the left hand side wall of the inner vessel at the desired distance from the outer wall. Then follows a return movement of the outer flask body with the mass of glass for the inner flask or of the tool beyond the central initial position, into the position shown in Figures 5 and 6 on the right hand side of the outer body, thus forming the right hand side of the inner flask wall. By repeating the described process a number of times, the mandrel being at the same time lowered progressively relatively to within the outer vessel, the desired non-circular cross-section of the inner vessel will be produced (Figures 7 and 8).

This non-circular cross-section, however, need not be symmetrical to two axes intersecting at right angles, but it may have any shape such as is shown for example in Figures 9 and 11. In this case, the movement of the outer flask body with the mass of glass for the formation of the inner body or of the mandrel is not rectilinear, but follows any suitable curve symmetrically about a centre. In this case, it is also not necessary for the return movement to proceed along the same line as the forward movement but, as shown in Figure 11, it may also take place along a separate curve.

The device for forming the inner body need not, as shown in Figures 1 to 8, consist of one piece, but it may also be divisible (Figures 12 and 13). This divisibility is particularly advantageous and necessary, when the major axis of the cross section is so large in comparison with the diameter of the neck that, during the sideways movement of the mandrel, the soft mass of glass cannot be moved far enough sideways in order to obtain the desired narrow space between the outer vessel and inner vessel. In this case, the mandrel is first passed in the closed state through the neck of the outer vessel and is not expanded until then. In this case, it is preferable to cover the space formed, by the expanding of the tool, between the parts $f$ by a movable bottom plate $g$.

In some cases, it has been found necessary to allow the mandrel to act with rotation on the mass of glass intended for the formation of the inner body. This is particularly advantageous for the purpose of obtaining as great as possible uniformity of the wall thickness of the inner body. For this purpose, the mandrel may be divided into two shear-like blades $h$, as shown in Figures 14 to 23. These blades while being rotated and pushing the mass of glass for the inner body in front of them are introduced in the closed position (Figs. 14 and 15), through the neck of the outer vessel and are inserted into the said outer vessel as far as is required for forming the shoulder portion of the inner vessel. In manipulating the shear device, the blades $h$ are opened out and, due to their rotation, a round body is first formed out of the mass of glass (Figures 16 and 17). In order to make an inner body having a non-circular and cross-section, either the outer vessel $c$ with the mass of glass $d$ for the inner body $b$ is moved exactly as described above, or the rotating distending device or mandrel is moved in the direction provided (Figures 18 to 21). Thereupon, the shear-like mandrel is again closed and removed through the neck of the finished vessel as shown in Figures 22 and 23.

As will be seen from Figures 1 to 8 and 12 to 23, the walls of the inner vessel, which are produced by the relative movement of blank and tool (mandrel) perpendicularly to the longitudinal axis of the tool, have plane portions parallel to the major axis of the cross section of the vessel.

Plane walls, however, suffer from the disadvantage that, after the air in the space between the outer and inner vessels has been exhausted, they offer only a very small resistance to the outer pressure of the air which thereby becomes effective, and experience has shown that they are the cause of the ready breakage of the vessel.

This disadvantage may be eliminated by replacing the weak plane surfaces by curved surfaces which offer sufficient resistance to the pressure.

The formation of such curved surfaces is effected according to Figures 24 and 25 for example as follows:

After the first stage of the operation is completed and the distending device or mandrel is in the position shown in Figures 20 and 21—in this case, the movement of the mandrel in the direction of the longitudinal axis of the vessel proceeds intermittently—the mandrel is returned into the central position as shown in Figures 24 and 25. (Of course, in carrying out this process, an outer vessel with curved side walls is used as is shown in Figure 25).

In the middle position as shown in Figures 24 and 25, the mandrel is opened out further, so that the plane side wall portions of the inner vessel, which are still in a soft workable condition, are given the desired curvature (in Figures 24 and 25, the first opened-out position of the mandrel is shown in dot-and-dash lines, while the subsequent opened position is shown in full lines). After finishing the curvature, the mandrel is brought back to the first opened-out position, and the described working stages are repeated until the inner vessel is completed.

The essentially new and surprising feature in the process shown in Figures 14 to 25 is that the soft mass of glass $d$ in the hot, molten state is not pressed into the space $i$ between the opened-out blades $h$ when being pressed down, which would result in an undesired deformation of the inner vessel produced, but that, as shown in Figures 16, 18 and 20, such glass forms a rectilinear connection between the blades. This phenomenon may be attributed chiefly to the consistency of the soft mass of glass but also, during the first part of the process, in making a circular inner body, to the rotation of the blade-like mandrel and finally, in forming the non-circular cross-section, to the additional lateral movement of vessel body or mandrel.

Expansible mandrels are known per se. They are all provided, however, in prior constructions with a base plate, even though the latter is of the simplest construction, which bridges in some way or other the intermediate space between the opened parts of the mandrel with the object of preventing soft glass being pushed into the said opened parts.

Such closed parts on that end of the mandrel which is advancing into the soft mass of glass are rendered unnecessary by the new process. It is, therefore, possible to restrict the construction of the mandrel to the simplest conceivable form, while eliminating all intermediate members, namely to restrict it to the provision of only two, individual blade-like parts, which can be manipulated in the simplest manner after the fashion of a pair of shears. This means a considerable advance in regard to construction.

In the examples so far discussed, the glass vessel and mandrel move relatively to one another.

In Figures 26 and 27, the new process is carried out in such a manner that both articles are stationary relatively to one another in the horizontal direction. In this case, an arrangement resembling the mandrel shown in Figures 14 to 25 is employed, and is so constructed that the surfaces of its blades in the closed position correspond approximately to the minor diameter of the inner, non-circular vessel which is to be formed. Now, a round inner glass body is formed in the known manner as the first stage of the process. If the mandrel were to be opened out now to its greatest diameter, the inner mass of glass would be pressed against the longitudinal side of the outer body and would therefore damage it. This is avoided by a procedure in which the diameter of the circle described by the edges of the mandrel during the formation of the non-circular inner vessel, is not kept constant, but varies in accordance with the size of the major axis of the outer vessel, in other words, the mandrel is opened and closed again during the rotation, this being done in such a manner that it is always opened when its blades are in the position m—m (Figures 26 and 27) of the major axis of the cross-section, and that it is always closed or almost closed when its blades are in the position k—k of the minor axis of the cross-section. In Figures 26 and 27, there is also shown an intermediate opened-out position l—l. The opening and closing of the mandrel is effected mechanically by any well-known or approved mechanism (not shown) which may be of very simple construction. During the opening and closing, glass vessel and mandrel are moved in known manner perpendicularly to one another, until the desired non-circular inner body has been completely formed.

As will be seen in Figures 28 to 43, the inner vessel may also be made by moving the outer vessel and mandrel eccentrically relatively to one another in a curve, the eccentric movement proceeding during the entire process of making the inner vessel, i. e. during the cylindrical drawing-out of the inner vessel. Preferably, the eccentric movement is commenced as soon as the neck has been formed, i. e. at the place where the shoulder of the inner vessel is to lie.

The eccentric movement for the purpose of widening out the inner flask is effected either intermittently or simultaneously with a slow progressive and continuous movement of the mandrel from above downward, until the inner flask is completed over its entire length. Thus, the inner vessel may be formed and finished without any rotation of the mass of glass which is to be worked or without damage to the glass already worked up.

The mass of glass intended for the formation of the inner flask is pushed by the mandrel through the neck of the outer flask. In the dotted line position shown in Figure 28, that is to say, at the level of the neck, the mandrel is first of all stopped for some time in order to allow the mass of glass to cool if necessary. The downward movement is then continued down to the point where the shoulder of the inner vessel to be made is to rest. When this position has been reached, the eccentric movement of the mandrel and outer vessel relatively to one another takes place, the inner flask being thus expanded in its entire cross-section, in accordance with the length of the mandrel. The several phases of this manufacturing operation will be seen in Figures 28 to 35.

It should be noted that during this step in the manufacture of the inner flask, there is no rotation of, or possibility of damage to the glass which is being worked, because in the first place, the mass of glass which is pushed through the neck of the outer flask has already solidified so far that twisting is impossible, and secondly, the forward movement of the mandrel precedes the solidification of the glass at such an interval that its viscous condition still permits of convenient working.

Figure 34:
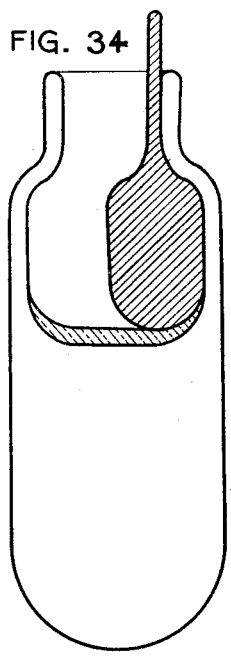
Figure 36:
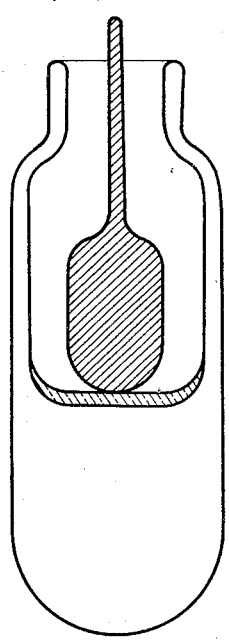
Figure 29:
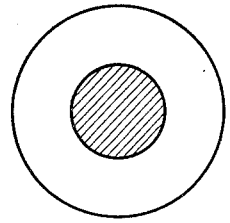
Figure 35:
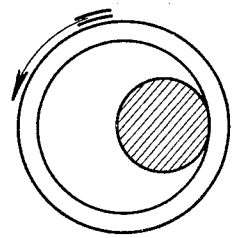
Figure 37:
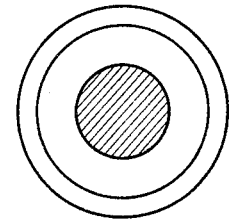
Figure 32:
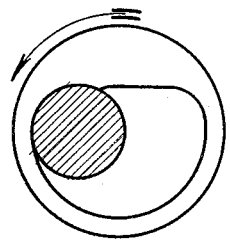
Figure 33:
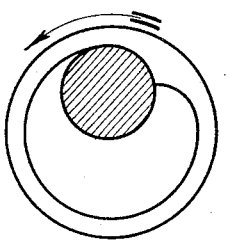
Figure 38:
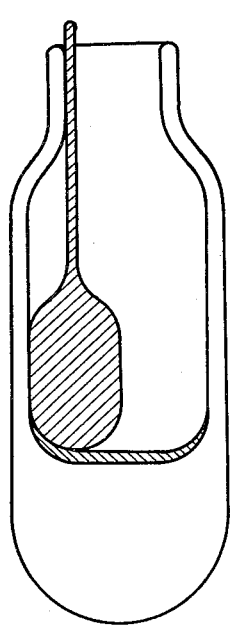
Figure 40:
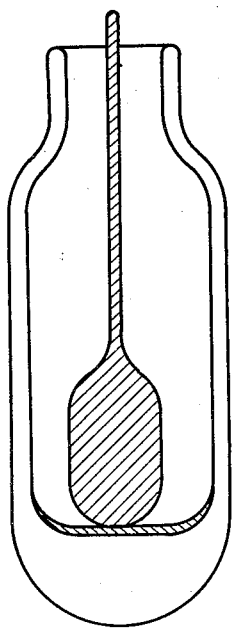
Figure 42:
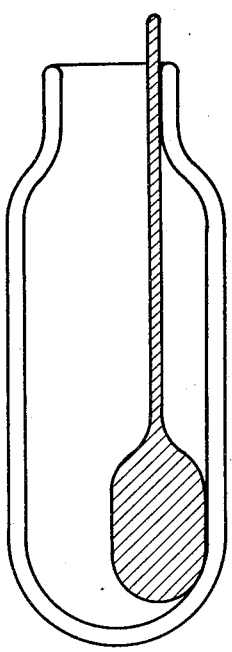
Figure 39:
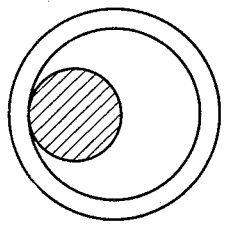
Figure 41:
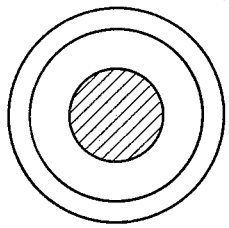
Figure 43:
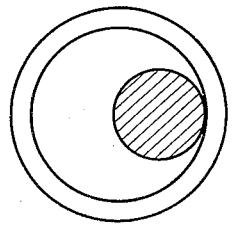

After the forming of the inner flask has proceeded as far as is shown in Figures 34 and 35, the subsequent downward movement of the mandrel into the interior of the outer vessel is continued, it being borne in mind that the movement of the tool should take place in accordance with the rate of solidification of the glass, until the inner body has been finished over its entire length. This operation may be carried out intermittently, or in a slowly progressive and continuous movement. The individual phases are shown in Figures 36 to 43.

This process may be carried out irrespective of the shape of the plan of the vessel which is to be produced, and which may be of circular or non-circular cross-section. For the purpose of forming a vessel of non-circular cross-section, preferably the eccentric movement shown in Figures 28 to 43 will be combined with a rectilinear movement (as shown in Figures 1 to 23) or a movement along a curve symmetrical about a centre (as shown in Figures 9 to 11).

The mandrel required for the process consists either of one piece or is composed of a number of parts which may be stationary relatively to one another or may be movable in any manner relatively to one another.

For the manufacture of double-walled vacuum vessels having a relatively wide body in comparison with the neck aperture, it has been found preferable to employ an expansible mandrel. This is pushed in the closed condition through the neck of the outer vessel and is first of all opened out at the level of the shoulder position of the inner vessel, so that a cylindrical body of the length of the mandrel is produced, the diameter of the said cylindrical body being smaller than that of the finished inner vessel. Preferably, the eccentric movement and finishing of the inner body will take place only after the cylindrical body has been produced as just described.

What we claim is:

1. The process of making double-walled glass vessels, which consists in forming the outer wall of the vessel and freely suspending within the outer wall, from the mouth portion of said outer wall, while the latter is in upright position, a mass of glass from which to form the inner wall of said vessel, then introducing a mandrel into the vessel lengthwise and effecting a relative transverse bodily movement of vessel and mandrel in a plane perpendicular to the longitudinal axis of the vessel, to distend said inner wall laterally.

2. The process of making double-walled glass vessels, which consists in forming the outer wall of the vessel and freely suspending within the outer wall, from the mouth portion of said outer wall, while the latter is in upright position, a mass of glass from which to form the inner wall of said vessel, then introducing a mandrel into the vessel and moving such mandrel lengthwise to stretch said mass of glass lengthwise toward the bottom of the outer wall, and simultaneously imparting to said mandrel an additional bodily motion exerting an outward transverse pressure on said inner wall to widen the same.

3. The process of making double-walled glass vessels, which consists in forming the outer wall of the vessel and freely suspending within the outer wall, from the mouth portion of said outer wall, while the latter is in upright position, a mass of glass from which to form the inner wall of said vessel and widening said inner wall to non-circular cross section by pushing it outwardly to different distances at different points thereof.

4. The process of making doubled-walled glass vessels, which consists in first forming an outer wall of non-circular cross section and freely suspending within such outer wall, from the mouth portion of said outer wall, while the latter is in upright position, a mass of glass from which to form the inner wall of said vessel, shaping said mass into a hollow body of circular cross-section, and expanding such body into an inner wall of non-circular cross section similar to that of the outer wall.

5. The process of making double-walled glass vessels, which consists in forming the outer wall of the vessel and freely suspending from the mouth portion of said outer wall, while the latter is in upright position, a mass of glass from which to form the inner wall of said vessel, introducing a mandrel through the mouth portion of said mass, to form the neck of the inner wall, and after said mandrel has passed down beyond such neck, imparting to the mandrel an additional bodily motion exerting an outward transverse pressure on said inner wall to widen the same.

6. The process of making double-walled glass vessels, which consists in forming the outer wall of the vessel and freely suspending from the mouth portion of the outer wall, while the latter is in upright position, a mass of glass from which to form the inner wall of said vessel, then introducing an expansible rotary mandrel into the vessel and moving said mandrel lengthwise against said mass of glass to stretch it toward the bottom of the outer wall and progressively expanding said mandrel during its rotation as it is moved to different points in its lengthwise travel, and imparting to said rotary mandrel a bodily lateral motion exerting an outward pressure on said inner wall to widen the same.

7. The process of making double-walled glass vessels, which consists in forming the outer wall of the vessel and freely suspending from the mouth portion of the outer wall, while the latter is in upright position, a mass of glass from which to form the inner wall of said vessel, then introducing an expansible rotary mandrel into the vessel and moving said mandrel lengthwise against said mass of glass to stretch it toward the bottom of the outer wall and progressively expanding said mandrel during its rotation as it is moved to different points in its lengthwise travel, and effecting a relative reciprocation of said mandrel and vessel in a straight line transverse to the axis of the vessel, whereby an inner wall will be formed with plane portions parallel to the path of such reciprocation, then bringing said expansible mandrel to an axial position and rotating it in such axial position while expanding it so as to give a curved form to said plane portions of the inner wall.

8. The process of making double-walled glass vessels, which consists in forming the outer wall of the vessel and freely suspending from the mouth portion of said outer wall while the latter is in upright position, a mass of glass from which to form the inner wall of said vessel, then introducing a rotary mandrel into the vessel and moving said mandrel lengthwise against said mass of glass to stetch it toward the bottom of the outer wall, and alternately expanding and contracting said mandrel during one complete revolution thereof while the mandrel is rotating about the axis of the vessel, whereby a shape of non-circular cross section will be given to the inner wall by the rotation of the mandrel.

9. The process of making double-walled glass vessels, which consists in forming the outer wall of the vessel and freely suspending within the outer wall, from the mouth portion of said outer wall, while the latter is in upright position, a mass of glass from which to form the inner wall of said vessel, then introducing a mandrel into the vessel and moving such mandrel lengthwise to stretch said mass of glass lengthwise toward the bottom of the outer wall and imparting to said mandrel, a lateral motion first toward one side and then toward the other to exert an outward pressure on said inner wall and give it a cross-section of a shape elongated in the direction of such lateral motion.

MAX BATSCHÜK.
WILHELM HODECKER.